US007582684B2

(12) United States Patent  (10) Patent No.: US 7,582,684 B2
Rasmussen et al.  (45) Date of Patent: Sep. 1, 2009

(54) MACROPOROUS ION EXCHANGE RESINS

(75) Inventors: Jerald K. Rasmussen, Stillwater, MN (US); James I. Hembre, Plymouth, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 205 days.

(21) Appl. No.: 11/059,858

(22) Filed: Feb. 17, 2005

(65) Prior Publication Data

US 2005/0261385 A1    Nov. 24, 2005

Related U.S. Application Data

(63) Continuation of application No. 10/849,700, filed on May 20, 2004, now Pat. No. 7,098,253.

(51) Int. Cl.
C08J 5/20 (2006.01)
B01J 39/20 (2006.01)

(52) U.S. Cl. .............. 521/31; 521/25; 521/29; 526/303.1; 526/307.2; 526/309; 526/909; 502/402; 210/635; 428/304.4

(58) Field of Classification Search .......... 521/25, 521/29, 31; 526/303.1, 307.2, 309, 909; 502/402; 210/635; 428/304.4
See application file for complete search history.

(56) References Cited

U.S. PATENT DOCUMENTS

| | | | |
|---|---|---|---|
| 2,527,300 A | 10/1950 | Dudley | |
| 3,058,594 A | 10/1962 | Hultgren | |
| 3,929,741 A | 12/1975 | Laskey | |
| 4,071,508 A | 1/1978 | Steckler | |
| 4,097,420 A | 6/1978 | Mikes et al. | |
| 4,134,815 A * | 1/1979 | Jackson et al. | 521/31 |
| 4,139,684 A | 2/1979 | Coupek et al. | |
| 4,153,661 A | 5/1979 | Ree et al. | |
| 4,157,418 A | 6/1979 | Heilmann | |
| 4,311,799 A * | 1/1982 | Miyake et al. | 521/31 |
| 4,446,261 A | 5/1984 | Yamaski et al. | |
| 4,552,939 A | 11/1985 | Thaler et al. | |
| 4,565,663 A | 1/1986 | Errede et al. | |
| 4,810,381 A | 3/1989 | Hagen et al. | |
| 4,833,198 A | 5/1989 | Stanley, Jr. et al. | |
| 4,842,739 A | 6/1989 | Tang | |
| 4,957,943 A | 9/1990 | McAllister et al. | |
| 4,971,736 A | 11/1990 | Hagen et al. | |
| 5,037,858 A | 8/1991 | MacDonald | |
| 5,104,729 A | 4/1992 | Stedronsky | |
| 5,171,808 A | 12/1992 | Ryles et al. | |
| 5,264,125 A | 11/1993 | MacDonald et al. | |
| 5,403,902 A | 4/1995 | Heilmann et al. | |
| 5,468,847 A | 11/1995 | Heilmann et al. | |
| 5,561,097 A | 10/1996 | Gleason et al. | |
| 5,814,322 A | 9/1998 | Sebillotte-Arnaud | |
| 5,906,747 A | 5/1999 | Coffman et al. | |
| 5,993,935 A | 11/1999 | Rasmussen et al. | |
| 6,045,697 A | 4/2000 | Girot et al. | |
| 6,059,975 A | 5/2000 | Alexandratos et al. | |
| 6,323,249 B1 | 11/2001 | Dale et al. | |
| 6,423,666 B1 | 7/2002 | Liao et al. | |
| 6,590,094 B2 | 7/2003 | Karlou-Eyrisch et al. | |
| 6,756,462 B2 | 6/2004 | Pafford et al. | |
| 6,765,049 B2 | 7/2004 | Lorah et al. | |
| 6,897,347 B2 | 5/2005 | Purola et al. | |
| 7,098,253 B2 | 8/2006 | Rasmussen et al. | |
| 2002/0086908 A1 | 7/2002 | Chou et al. | |
| 2003/0018091 A1 | 1/2003 | Pafford et al. | |
| 2003/0078330 A1 | 4/2003 | Legrand et al. | |
| 2003/0088134 A1 | 5/2003 | Purola et al. | |
| 2003/0130462 A1 | 7/2003 | Ulbricht et al. | |
| 2005/0261384 A1 | 11/2005 | Rasmussen et al. | |
| 2007/0142586 A1 | 6/2007 | Rasmussen et al. | |
| 2007/0142590 A1 | 6/2007 | Rasmussen et al. | |

FOREIGN PATENT DOCUMENTS

| | | |
|---|---|---|
| JP | 05-247123 | 9/1993 |
| WO | WO 00/49031 | 8/2000 |
| WO | WO 01/25285 | 4/2001 |
| WO | WO 02/00337 | 1/2002 |
| WO | WO 02/087551 | 11/2002 |
| WO | WO 2007/075508 | 7/2007 |

OTHER PUBLICATIONS

Huval et al. European Polymer Journal, 40 (2004), 693-701.*
Drtina et al., "Highly Cross-Linked Azlactone Functional Supports of Tailorable Polarity", *Macromolecules*, vol. 29, No. 13, pp. 4486-4489 (1996).
Sherrington, "Preparation, structure and morphology of polymer supports", *Chem Commun.*, pp. 2275-2286 (1998).
Rasmussen et al., *Makromol. Chem., Macromol. Symp.*, No. 54/55, pp. 535-550 (1992).
Sherrington, "Preparation, Structure and Morphology of Polymer Supports", Chem. Commun., pp. 2275-2286, 1998, XP-002336051.

(Continued)

*Primary Examiner*—Helen L. Pezzuto
(74) *Attorney, Agent, or Firm*—Jean A. Lown

(57) ABSTRACT

Ion exchange resins are described that are hydrophilic, crosslinked (meth)acrylic copolymers. The ion exchange resins are macroporous, have a surface area of at least 50 m$^2$/g, and an average particle size of at least 20 micrometers. Additionally, chromatographic columns containing the ion exchange resins, composite materials containing the ion exchange resin, filtration elements containing the ion exchange resin, methods of preparing the ion exchange resins, and methods of separating or purifying negatively or positively charged materials with the ion exchange resins are described.

18 Claims, No Drawings

OTHER PUBLICATIONS

Macintyre, Fiona, et al., "Control of Porous Morphology in Suspension Polymerized Poly(divinylbenzene) Resins Using Oligomeric Porogens", *Macromolecules*, vol. 37, No. 20 (Sep. 3, 2004) pp. 7628-7636.

Palm, Anders, et al., Macroporous Polyacrylamide/Poly(ethylene glycol) Matrixes as Stationary Phases in Capillary Electrochromatography, *Analytical Chemistry*, vol. 69, No. 22, (Nov. 15, 1997) pp. 4499-4507.

Viklund, Camilla, et al., "Preparation of Porous Poly(styrnee-co-divinylbenzene) Monoliths with Controlled Pore Size Distributions Initiated by Stable Free Radicals and Their Pore Surface Functionalization by Grafting", *Macromolecules*, vol. 34, No. 13, (May 17, 2001) pp. 4361-4369.

Xie, Shaofeng, et al., "Preparation of Porous Hydrophilic Monoliths: Effect of the Polymerization Conditions on the Porous Properties of Poly(acrylamide-co-N-N'-methylenebisacrylamide) Monolithic Rods", *Polymer Science*, (1996) pp. 1013-1021.

* cited by examiner

MACROPOROUS ION EXCHANGE RESINS

RELATED APPLICATIONS

This application is a continuation patent application of U.S. patent application Ser. No. 10/849,700 filed on May 20, 2004 now U.S. Pat. No. 7,098,253.

TECHNICAL FIELD

Macroporous ion exchange resins are provided that are based on (meth)acrylic copolymers.

BACKGROUND

Ion exchange resins are widely used within the biotechnology industry for the large-scale separation or purification of various biomolecules such as proteins, enzymes, vaccines, DNA, and RNA. The vast majority of the ion exchange resins are based on either styrene/divinylbenzene copolymers or crosslinked agarose. The hydrophobic backbone of styrene/divinylbenzene copolymers can be prone to nonspecific interactions with a number of materials leading to impure products. Although crosslinked agarose resins are generally less susceptible to nonspecific interactions, these materials tend to be fairly soft gels and are usually unsuitable for purifications conducted within a chromatographic column using a high flow rate.

Although some known ion exchange resins are based on (meth)acrylic copolymers, many of these resins are gels or have a relatively low capacity.

SUMMARY

Ion exchange resins, chromatographic columns containing the ion exchange resins, composite materials containing the ion exchange resins, filter elements containing the ion exchange resins, methods of preparing the ion exchange resins, and methods of separating or purifying charged materials using the ion exchange resins are provided. More specifically, the ion exchange resins are macroporous particles of a hydrophilic, crosslinked (meth)acrylic copolymer.

In one aspect, an ion exchange resin is provided that is the reaction product of a monomer mixture that is substantially free of a monomer having a lipophilicity index greater than 20. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

In a second aspect, a method of preparing an ion exchange resin is provided. The method includes forming an aqueous phase monomer mixture that is substantially free of a monomer having a lipophilicity index greater than 20, suspending the aqueous phase monomer mixture in a non-polar solvent, and polymerizing the monomer mixture to form macroporous particles of the ion exchange resin. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

In a third aspect, a method of separating or purifying a charged material is provided. The method includes contacting a sample that contains a charged material having a first charge with an ion exchange resin having a second charge opposite the first charge and adsorbing the charged material on the ion exchange resin. The ion exchange resin is the reaction product of a monomer mixture that is substantially free of a monomer having a lipophilicity index greater than 20. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

In a fourth aspect, a chromatographic column is provided. The chromatographic column includes a column at least partially filled with an ion exchange resin. The ion exchange resin is the reaction product of a monomer mixture that is substantially free of a monomer having a lipophilicity index greater than 20. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

In a fifth aspect, a filtration element is provided that includes a filtration medium and an ion exchange resin disposed on a surface of the filtration layer. The ion exchange resin is the reaction product of a monomer mixture that is substantially free of a monomer having a lipophilicity index greater than 20. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

In a sixth aspect, a composite material is provided that includes a continuous, porous matrix and an ion exchange resin incorporated within the porous matrix. The ion exchange resin is the reaction product of a monomer mixture that is substantially free of a monomer having a lipophilicity index greater than 20. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

The above summary of the present invention is not intended to describe each disclosed embodiment or every implementation of the present invention. The detailed description that follows more particularly exemplifies these embodiments.

DETAILED DESCRIPTION

Ion exchange resins are provided that are hydrophilic, crosslinked (meth)acrylic copolymers. The ion exchange resins are in the form of macroporous particles having a surface area of at least 50 $m^2/g$ and an average particle size of at least 20 micrometers. Additionally, chromatographic columns containing the ion exchange resins, composite materials containing the ion exchange resins, filter elements containing the ion exchange resins, methods of preparing the ion exchange resins, and methods of separating or purifying charged materials with the ion exchange resins are described.

As used herein, the term "(meth)acrylic" refers to a polymer or a copolymer that is the reaction product of acrylic acid, methacrylic acid, derivatives of acrylic acid or methacrylic acid, or combinations thereof. As used herein the term "(meth)acrylate" refers to monomers that are acrylic acid, methacrylic acid, derivates of acrylic acid or methacrylic acid, or combinations thereof. Suitable derivatives include esters, salts, amides, nitrites, and the like that can be unsubstituted or substituted. Some of these derivatives can include an ionic group.

As used herein, the terms "polymer" or "polymeric" refer to a material that is a homopolymer or copolymer. Likewise, the terms "polymerize" or "polymerization" refer to the process of making a homopolymer or copolymer. As used herein, the term "homopolymer" refers to a polymeric material prepared using one monomer. As used herein, the term "copolymer" refers to a polymeric material that is prepared using two or more different monomers.

As used herein, the term "charged" refers to a material that has a covalently attached ionic group as part of its chemical structure. A negatively charged material is an anion and a positively charged material is a cation. An oppositely charged counterion is typically associated with the covalently attached ionic group. The charge of some ionic groups can be altered by adjusting the pH.

The ion exchange resins are in the form of macroporous particles. As used herein, the term "macroporous" refers to particles that have a permanent porous structure even in the dry state. Although the resins can swell when contacted with a solvent, swelling is not needed to allow access to the interior of the particles through the porous structure. In contrast, gel-type resins do not have a permanent porous structure in the dry state but must be swollen by a suitable solvent to allow access to the interior of the particles. Macroporous particles are further described in Sherrington, *Chem. Commun.*, 2275-2286 (1998). The macroporous ion exchange resins typically have pores with a size of 20 to 2000 Angstroms (i.e., the pore size can be characterized using nitrogen adsorption at various relative pressures under cryogenic conditions).

The ion exchange resin particles can have an irregular shape or can be spherical or roughly spherical. In some ion exchange resins, the particles are beads. The particles usually have an average size of at least 20 micrometers. The average size of the particles can be determined using techniques such as light scattering or electron microscopy with image analysis. In some applications, the ion exchange resins have an average particle size of 20 to 500 micrometers, 50 to 500 micrometers, 20 to 200 micrometers, 50 to 200 micrometer, 50 to 100 micrometers, 50 to 75 micrometers, 50 to 70 micrometers, or 60 to 70 micrometers.

If the average size of the ion exchange resin particles is less than about 20 micrometers, then the back pressure in a chromatographic column filled with the particles may become unacceptably large, especially for the large columns useful for the purification or separation of large biomolecules. Although the average particle size can be as large as 2000 micrometers, the average particle size is typically no greater than 500 micrometers. If the average particle size is larger than about 500 micrometers, the efficiency of the chromatographic process may be low, especially for the purification or separation of large biomacromolecules such as proteins that often have low diffusion rates into the pores of the ion exchange resin. For example, to achieve the same degree of separation or purity with larger ion exchange resins that can be obtained using ion exchange resins of 20 to 500 micrometers, a greater amount of the resin, a longer chromatographic column, a slower flow rate, or a combination thereof may be needed.

The surface area of the ion exchange resins can be determined using the BET nitrogen adsorption method. This method is commonly used to determine surface area and involves adsorbing a monolayer of nitrogen on the surface of the ion exchange resin under cryogenic conditions. The amount of adsorbed nitrogen is proportional to the surface area. The amount of nitrogen is typically a monolayer in thickness. Some ion exchange resins have a surface area of at least 50 m$^2$/g (e.g., at least 75 m$^2$/g or at least 100 m$^2$/g). The ion exchange resins usually have a surface area no greater than 500 m$^2$/g. Some ion exchange resins have a surface area no greater than 400 m$^2$/g, no greater than 300 m$^2$/g, or no greater than 250 m$^2$/g. The surface area of the ion exchange resins is often in the range of 50 m$^2$/g to 500 m$^2$/g. Some ion exchange resins have a surface area of 100 m$^2$/g to 400 m$^2$/g, 100 m$^2$/g to 300 m$^2$/g, or 100 m$^2$/g to 250 m$^2$/g.

The ion exchange resins are the reaction product of a monomer mixture that includes various hydrophilic monomers. More specifically, the monomer mixture contains greater than 25 weight percent of a N,N'-alkylenebis(meth)acrylamide crosslinking monomer (i.e., N,N'-alkylenebisacrylamide or N,N'-alkylenebismethacrylamide) and at least 35 weight percent of an ionic monomer based on a total weight of monomers in the monomer mixture.

Suitable N,N'-alkylenebis(meth)acrylamide crosslinking monomers include, but are not limited to, N,N'-methylenebisacrylamide, N,N'-methylenebismethacrylamide, N,N'-ethylenebisacrylamide, N,N'-ethylenebismethacrylamide, N,N'-propylenebisacrylamide, N,N'-propylenebismethacrylamide, N,N'-hexamethylenebisacrylamide, N,N'-hexamethylenebismethacrylamide, N,N'-piperazinebisacrylamide, and N,N'-piperazinebismethacrylamide. The N,N'-alkylenebis(meth)acrylamide is at least bifunctional and can crosslink one polymeric chain with another polymeric chain or can crosslink one part of a polymeric chain with another part of the same polymeric chain.

The monomer mixture includes greater than 25 weight percent N,N'-alkylenebis(meth)acrylamide based on the total weight of monomers in the monomer mixture. When lower levels of the crosslinking monomer are used, the ion exchange resin tends to be a gel rather than in the form of macroporous particles. The rigidity and mechanical strength of the ion exchange resin tends to increase with the amount of crosslinking monomer included in the monomer mixture.

The monomer mixture often contains up to 65 weight percent N,N'-alkylenebis(meth)acrylamide crosslinking monomer based on the total monomer weight. When the amount of the crosslinking monomer exceeds 65 weight percent, the ion exchange resin often has diminished capacity because there is a corresponding decrease in the amount of ionic monomer present in the monomer mixture.

Ion exchange resins prepared from a monomer mixture that contains greater than 25 to 65 weight percent N,N'-alkylenebis(meth)acrylamide crosslinking monomer tend to be macroporous, and tend to have a high capacity. Some ion exchange resins contain greater than 25 to 60 weight percent, 30 to 60 weight percent, greater than 25 to 55 weight percent, 30 to 55 weight percent, greater than 25 to 50 weight percent, 30 to 50 weight percent, greater than 25 to 45 weight percent, 30 to 45 weight percent, greater than 25 to 40 weight percent, 30 to 40 weight percent, greater than 25 to 35 weight percent, or 30 to 35 weight percent crosslinking monomer based on the total weight of monomer in the monomer mixture.

As used herein, the term "capacity" refers to the maximum amount of positively or negatively charged material that can be adsorbed on the ion exchange resin. The capacity is generally related to the concentration of ionic monomer included in the monomer mixture used to prepare the ion exchange resin. The capacity can be determined by measuring the amount of a charged material that can be adsorbed on the ion exchange resin. For example, the capacity can be given in terms of the amount of a biomolecule such as a protein that can be adsorbed.

In particular, the capacity of a cation exchange resin can be given in terms of the amount of the protein lysozyme that can be adsorbed. Some cation exchange resins have a lysozyme capacity that is at least 50 mg/ml (i.e., 50 milligrams of lysozyme per milliliter of cation exchange resin). For example, some cation exchange resins can have a lysozyme capacity that is at least 75 mg/ml, at least 80 mg/ml, at least 90 mg/ml, or at least 100 mg/ml. Some cation exchange resins have a lysozyme capacity of 50 mg/ml to 250 mg/ml, 75 mg/ml to 250 mg/ml, 90 mg/ml to 250 mg/ml, or 90 mg/ml to 200 mg/ml.

The capacity of an anion exchange resin can be given in terms of the amount of the protein bovine serum albumin that can be adsorbed. Some anion exchange resins have a bovine serum albumin capacity that is at least 10 mg/ml (i.e., 10 milligrams of bovine serum albumin per milliliter of anion exchange resin). For example, some anion exchange resins have a bovine serum albumin capacity that is at least 15 mg/ml, at least 20 mg/ml, at least 25 mg/ml, at least 30 mg/ml, or at least 40 mg/ml. Some anion exchange resins have a bovine serum albumin capacity of 10 mg/ml to 80 mg/ml, 10 mg/ml to 70 mg/ml, 20 mg/ml to 70 mg/ml, 20 mg/ml to 60 mg/ml, 30 mg/ml to 60 mg/ml, or 30 mg/ml to 50 mg/ml.

The monomer mixture used to prepare the ion exchange resin includes at least 35 weight percent ionic monomer based on the total weight of monomers. The monomer mixture often includes up to 75 weight percent ionic monomer. The capacity of the resulting ion exchange resin tends to increase with higher levels of ionic monomer in the monomer mixture. However, if the amount of ionic monomer in the monomer mixture is above 75 percent, the amount of crosslinking monomer could decrease to such an extent that the resulting ion exchange resin would be a gel rather than a macroporous particle. A macroporous particle advantageously tends to be more rigid than a gel and can be used, for example, under higher flow rate conditions or under higher pressure conditions in a chromatographic column.

Some ion exchange resins are prepared from a monomer mixture that contains 35 to 75 weight percent, 35 to 70 weight percent, 35 to 60 weight percent, 35 to 50 weight percent, 40 to 75 weight percent, 40 to 70 weight percent, 40 to 60 weight percent, 50 to 75 weight percent, 50 to 70 weight percent, or 50 to 60 weight percent of the ionic monomer based on a total weight of monomers.

Cation exchange resins can be prepared using ionic monomers that include a weak acid, a strong acid, a salt of a weak acid, a salt of a strong acid, or combinations thereof. The resulting ion exchange resins have negatively charged groups capable of interacting with positively charged materials (i.e., cations). If the ionic monomer used to prepare a cation exchange resin includes a salt of a weak acid or a salt of a strong acid, the counter ions of these salts can be, but are not limited to, alkali metals, alkaline earth metals, ammonium ions, or tetraalkylammonium ions.

Some exemplary ionic monomers having a negative charge (i.e., groups suitable for use in a cation exchange resin) include (meth)acrylamidosulfonic acids of Formula I or salts thereof.

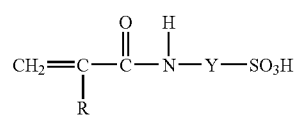

In Formula I, Y is a straight or branched alkylene having 1 to 10 carbon atoms and R is hydrogen or methyl. Exemplary materials according to Formula I include, but are not limited to, N-acryloylaminomethanesulfonic acid, 2-acrylamidoethanesulfonic acid, 2-acrylamido-2-methylpropane sulfonic acid, and 2-methacrylamido-2-methylpropane sulfonic acid. Salts of these acidic monomers can also be used.

Other suitable ionic monomers for preparing a cation exchange resin include sulfonic acids such as vinylsulfonic acid and 4-styrenesulfonic acid; amino phosphonic acids such as (meth)acrylamidoalkylphosphonic acids (e.g., 2-acrylamidoethylphosphonic acid and 3-methacrylamidopropylphosphonic acid); acrylic acid and methacrylic acid; and carboxyalkyl(meth)acrylates such as 2-carboxyethylacrylate, 2-carboxyethylmethacrylate, 3-carboxypropylacrylate, and 3-carboxypropylmethacrylate. Still other suitable acidic monomers include (meth)acryloylamino acids, such as those described in U.S. Pat. No. 4,157,418 (Heilmann), incorporated herein by reference. Exemplary (meth)acryloylamino acids include, but are not limited to, N-acryloylglycine, N-acryloylaspartic acid, N-acryloyl-β-alanine, and 2-acrylamidoglycolic acid. Salts of any of these acidic monomers can also be used.

Anion exchange resins can be prepared using ionic monomers that include a weak base, a strong base, a salt of a weak base, a salt of a strong base, or combinations thereof. The resulting ion exchange resins have positively charged groups capable of interacting with negatively charged materials (i.e., anions). If the ionic monomer for an anion exchange resin includes a salt of a weak base or a salt of a strong base, the counter ion of this salt is often a halide (e.g., chloride), a carboxylate (e.g., acetate or formate), nitrate, phosphate, sulfate, bisulfate, methyl sulfate, or hydroxide.

Some exemplary ionic monomers having a positive charge include amino (meth)acrylates. As used herein, the term "amino (meth)acrylate" refers to a derivative of methacrylic acid or acrylic acid that has a primary, secondary, tertiary, or quaternary amino group. The amino group can be part of an aliphatic group (i.e., linear, branched, or cyclic) or an aromatic group and can be wholly or partially in a protonated form. The amino (meth)acrylate can be in the form of a salt.

Exemplary amino (meth)acrylates include N,N-dialkylaminoalkyl(meth)acrylates such as, for example, N,N-dimethylaminoethylmethacrylate, N,N-dimethylaminoethylacrylate, N,N-dimethylaminopropylmethacrylate, N,N-dimethylaminopropylacrylate, N-tert-butylaminopropylmethacrylate, N-tert-butylaminopropylacrylate and the like. Other suitable amino (meth)acrylates include, for example, N-(3-aminopropyl) methacrylamide, N-(3-aminopropyl)acrylamide, N-(3-imidazolylpropyl)methacrylamide, N-(3-imidazolylpropyl) acrylamide, N-(2-imidazolylethyl)methacrylamide, N-(1,1

-dimethyl-3-imidazoylpropyl)methacrylamide, and N-(1,1-dimethyl-3-imidazoylpropyl)acrylamide, N-(3-benzoimidazolylpropyl)acrylamide, and N-(3-benzoimidizolylpropyl)methacrylamide.

Other suitable amino (meth)acrylate monomers include, for example, (meth)acrylamidoalkyltrimethylammonium salts (e.g., 3-methacrylamidopropyltrimethylammonium chloride and 3-acrylamidopropyltrimethylammonium chloride) and (meth)acryloxyalkyltrimethylammonium salts (e.g., 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate).

Other monomers that can provide positively charged groups to an ion exchange resin include the dialkylaminoalkylamine adducts of alkenylazlactones (e.g., 2-(diethylamino)ethylamine, (2-aminoethyl)trimethylammonium chloride, and 3-(dimethylamino)propylamine adducts of vinyldimethylaziactone) and diallylamine monomers (e.g., diallylammonium chloride and diallyldimthylammonium chloride).

The ion exchange resins can be prepared by polymerizing a monomer mixture that is substantially free of hydrophobic monomers. More specifically, the monomer mixture is substantially free of monomers having a lipophilicity index greater than 20. As used herein, the term "substantially free" refers to a monomer mixture that contains little, if any, hydrophobic monomer. The monomer mixture contains no greater than 2 weight percent, no greater than 1 weight percent, or no greater than 0.5 weight percent hydrophobic monomer based on the total weight of monomers. Ionic exchange resins that are substantially free of hydrophobic monomers tend to have low nonspecific adsorption of non-ionic materials.

As used herein, the term "lipophilicity index" or "LI" refers to an index for characterizing the hydrophobic or hydrophilic character of a monomer. The lipophilicity index is determined by partitioning a monomer in equal volumes (1:1) of a nonpolar solvent (e.g., hexane) and a polar solvent (e.g., a 75:25 acetonitrile-water solution). The lipophilicity index is equal to the weight percent of the monomer remaining in the non-polar phase after partitioning. Monomers that are more hydrophobic tend to have a higher lipophilicity index; similarly, monomers that are more hydrophilic tend to have a lower lipophilicity index. Measurement of lipophilicity index is further described in Drtina et al., *Macromolecules*, 29, 4486-4489 (1996).

Monomers that have a lipophilicity index greater than 20 and that are generally not in the monomer mixture include, for example, ethyleneglycoldimethacrylate (LI is 25), phenoxyethylmethacrylate (LI is 32), trimethylolpropanetrimethacrylate (LI is 37), methylmethacrylate (LI is 39), ethylmethacrylate (LI is 53), butylmethacrylate (LI is 73), cyclohexylmethacrylate (LI is 90), laurylmethacrylate (LI is 97), and the like.

Both the N,N'-alkylenebis(meth)acrylamide crosslinking monomer and the ionic monomer have a lipophilicity index no greater than 20. Any additional monomers that are included in the monomer mixture are hydrophilic and have a lipophilicity index no greater than 20. In some ion exchange resins, all the monomers in the monomer mixture have a lipophilicity index no greater than 15, no greater than 10, no greater than 5, no greater than 3, or no greater than 1.

Hydrophilic but non-ionic monomers can be added to the monomer mixture for the purpose of adjusting the capacity of the ion exchange resins while maintaining the amount of crosslinking monomer constant. That is, the capacity can be modified without significantly altering the amount of crosslinking, the rigidity of the ion exchange resin, or the porosity of the ion exchange resin. Additionally, the hydrophilic character of the ion exchange resins can be modified with the use of these non-ionic monomers.

Suitable hydrophilic, non-ionic monomers are typically present in amounts no greater than 40 percent based on the total weight of the monomers in the monomer mixture. In some ion exchange resins, the monomer mixture contains no greater than 30 weight percent, no greater than 25 weight percent, no greater than 20 weight percent, no greater than 15 weight percent, no greater than 10 weight percent, or no greater than 5 weight percent hydrophilic, non-ionic monomer based on the total weight of monomers.

Examples of non-ionic monomers that have a sufficiently low lipophilicity index include, but are not limited to, hydroxyalkyl(meth)acrylates such as 2-hydroxyethylacrylate, 3-hydroxypropylacrylate, 2-hydroxyethylmethacrylate (e.g., LI is 1), and 3-hydroxypropylmethacrylate (e.g., LI is 2); acrylamide (e.g., LI is less than 1) and methacrylamide (LI is less than 1); glycerol monomethacrylate and glycerol monoacrylate; N-alkyl(meth)acrylamides such as N-methylacrylamide (e.g., LI is less than 1), N,N-dimethylacrylamide (e.g., LI is less than 1), N-methylmethacrylamide, and N,N-dimethylmethacrylamide; N-vinylamides such as N-vinylformamide, N-vinylacetamide, and N-vinylpyrrolidone; acetoxyalky(meth)acrylate such as 2-acetoxyethylacrylate and 2-acetoxyethylmethacrylate (e.g., LI is 9); glycidyl (meth)acrylate such as glycidylacrylate and glycidylmethacrylate (e.g., LI is 11); and vinylalkylazlactone such as vinyldimethylazlactone (e.g., LI is 15).

The ion exchange resins are hydrophilic and usually have a low nonspecific adsorption (i.e., ion exchange resins prepared from monomer with low LI tend to have low nonspecific adsorption). The ion exchange resins typically adsorb various charged materials through interaction with the charged groups on the ion exchange resin and typically adsorb little, if any, material on the non-ionic portions of the ion exchange resin. This low nonspecific adsorption can advantageously result in better separation or purification of charged materials from other materials in a sample.

The ion exchange resin particles tend to be fairly rigid (i.e., the particles are not gels) and can be used, for example, in a chromatographic column with high flow rates. The ion exchange resins are suitable for use under the differential pressure conditions that are commonly encountered in chromatographic columns. As used herein, the term "differential pressure" refers to the pressure drop across a chromatographic column. For example, chromatographic columns used for the downstream purification or separation of therapeutic proteins can be used with superficial velocities (e.g., flow rates) such as at least 150 cm/hr, at least 250 cm/hr, at least 500 cm/hr, or at least 1000 cm/hr to increase productivity.

In small chromatographic columns (e.g., columns with a diameter less than about 5 cm), the packed bed of ion exchange resin is well supported by the column wall. In such columns, ion exchange resins having a relatively wide range of rigidity can withstand differential pressures in excess of 200 psi (1380 kPa). However, in large chromatographic columns (e.g., columns with a diameter greater than about 5 cm), the packed bed of ion exchange resin has less support from the column wall (e.g., a smaller fraction of the resin is in contact with the wall surfaces of the column). In such columns, ion exchange resins with higher rigidity tend to be able to withstand differential pressures of at least 25 psi (173 kPa). Some ion exchange resins can withstand a differential pressure of 50 psi (345 kPa) to 200 psi (1380 kPa).

Another aspect of the invention provides a method of preparing macroporous ion exchange resins. The method includes forming an aqueous monomer mixture substantially free of a monomer having a lipophilicity index greater than 20, suspending the aqueous monomer mixture in a non-polar solvent, and polymerizing the monomer mixture to form macroporous particles of the ion exchange resin. The aqueous monomer mixture includes a N,N'-alkylenebis(meth)acrylamide in an amount greater than 25 weight percent and an ionic monomer in an amount of at least 35 weight percent based on a total weight of monomers in the monomer mixture. The macroporous particles have an average size of at least 20 micrometers and a surface area of at least 50 $m^2/g$.

This polymerization method is an inverse polymerization process. An aqueous phase monomer mixture is dispersed or suspended in a non-polar solvent with the volume of the non-polar solvent being greater than the volume of the aqueous phase. The non-polar solvent is not miscible with the aqueous phase. In some embodiments, the volume ratio of non-polar to aqueous phases is in the range of 2:1 to 6:1. The aqueous phase monomer mixture is often dispersed as relatively small droplets in the non-polar solvent.

The aqueous phase can contain water plus a co-solvent that is miscible with water. Suitable co-solvents include alcohols (e.g., methanol, ethanol, n-propanol, and iso-propanol), dimethylsulfoxide, dimethylformamide, N-methylpyrrolidone, acetonitrile, tetramethylurea, and the like. The co-solvent can improve the solubility of some of the monomers such as the N,N'-alkylenebis(meth)acrylamide crosslinking monomer in the aqueous phase.

The aqueous phase is dispersed or suspended in a non-polar solvent. Besides functioning as an inert medium for dispersion of the polymerized material, the primary purpose of the suspending medium (i.e., non-polar solvent) is to dissipate the heat generated during the polymerization reaction. In some embodiments, the density of the suspension medium can be selected to be approximately the same as the aqueous phase Approximately matching these densities tends to result in the formation of more spherical particles as well as more uniformly sized particles.

Suitable nonpolar solvents are typically alkanes such as hexane, heptane, n-octane, isooctane, isododecane, and cyclohexane; halogenated hydrocarbons such as carbon tetrachloride, chloroform, and methylene chloride; aromatics such as benzene and toluene; low-viscosity silicone oils; or combinations thereof. For example, the non-polar solvent can be a mixture of heptane and methylene chloride or heptane and toluene.

A suspending agent (i.e., polymeric stabilizer) is often used to facilitate suspension of the aqueous phase droplets in the non-polar solvent. The suspending agent usually has both hydrophobic and hydrophilic portions. Suitable suspending agents include sorbitan sesquioleate, polyethylene oxide (20) sorbitan trioleate, polyethylene oxide (20) sorbitan monooleate, sorbitan trioleate, sodium di-2-ethylhexylsulfosuccinate, a copolymer of isooctylacrylate and acrylic acid, a copolymer of hexylacrylate and sodium acrylate, a copolymer of isooctylacrylate and 2-acrylamidoisobutyramide, and the like. The amount of suspending agent can influence the size of the ion exchange resin (i.e., the use of larger amounts of suspending agent often results in the formation of smaller ion exchange resin particles). The amount of the suspending agent is generally 0.1 to 10 weight percent based on the weight of the monomers in the monomer mixture. For example, the monomer mixture can contain 0.1 to 8 weight percent or 0.5 to 5 weight percent suspending agent based on the weight of monomers.

The size of the ion exchange resin is determined, to a large extent, by the size of the aqueous phase droplets. The droplet size can be affected by variables such as the rate of agitation, the temperature, the amount of the suspending agent, the choice of suspending agent, the choice of non-polar solvent, and the choice of any aqueous phase co-solvents. The rate of agitation, the type of suspending agent, and the amount of the suspending agent can often be used to control the aggregation or agglomeration of the resulting particles. A lack of aggregation is usually preferred.

An initiator can be added to the aqueous phase to commence the free radical polymerization reaction. The free radical initiator is usually soluble in water or in the water co-solvent mixture. Once the suspension has been formed, the free radical initiator can be activated thermally, photochemically, or through an oxidation-reduction reaction. The free radical initiator is often used in an amount of 0.02 to 10 weight percent based on the weight of the monomer mixture. In some examples, the free radical initiator is present in an amount of 2 to 6 weight percent based on the weight of the monomer mixture.

Suitable water soluble thermal initiators include, for example, azo compounds, peroxides or hydroperoxides, persulfates, or the like. Exemplary azo compounds include 2,2'-azobis[2-(2-imidazolin-2-yl)propane]dihydrochloride, 2,2'-azobis(2-amidinopropane)dihydrochloride, and 4,4'-azobis-(4-cyanopentanoic acid). Examples of commercially available thermal azo compound initiators include materials available from DuPont Specialty Chemical (Wilmington, Del.) under the "VAZO" trade designation such as "VAZO 44", "VAZO 56", and "VAZO 68". Suitable peroxides and hydroperoxides include acetyl peroxide, t-butyl hydroperoxide, cumene hydroperoxide, and peroxyacetic acid. Suitable persulfates include, for example, sodium persulfate and ammonium persulfate.

In other examples, the free radical initiator is a redox couple such as ammonium or sodium persulfate and N,N,N', N'-tetramethyl-1,2-diaminoethane; ammonium or sodium persulfate and ferrous ammonium sulfate; hydrogen peroxide and ferrous ammonium sulfate; cumene hydroperoxide and N,N-dimethylaniline; or the like.

The polymerization temperature typically depends on the specific free radical initiator chosen and on the boiling point of the non-polar solvent. The polymerization temperature is usually about 50° C. to about 150° C. for thermally initiated polymerizations. In some methods, the temperature is about 55° C. to about 100° C. For redox or photochemically initiated polymerizations, the temperature can be close to room temperature or below, if desired. The polymerization time can be about 30 minutes to about 24 hours or more. Typically, a polymerization time of 2 to 4 hours is sufficient.

Once the free radical polymerization reaction has been initiated, the (meth)acrylic copolymer tends to precipitate from the aqueous phase. Some of the aqueous phase can get trapped in the copolymer resulting in the formation of pores. The resulting ion exchange resins can be isolated, for example, by filtration or decantation and subjected to a series of washing steps, if desired. The ion exchange resins can be dried using any suitable method, if desired. In some methods, the resulting ion exchange resins can be fractionated using techniques such as screening, sedimentation, and air classification.

In another aspect, a method of separating or purifying a charged material is provided. The method includes contacting a sample that contains a charged material having a first charge with an ion exchange resin having a second charge opposite the first charge and adsorbing the charged material on the ion exchange resin. The ion exchange resin is the reaction product of a monomer mixture that is substantially free of a monomer having a lipophilicity index greater than 20. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

The sample containing negatively charged materials can be contacted with an anion exchange resin at a pH where the anion exchange resin has positively charged groups (e.g., at a pH of 2 to 7). To release the adsorbed material from the anion exchange resin, the pH can be raised to at least 8 (e.g., the pH can be 10 to 12). Alternatively, when the charged material is a biomolecule, the sample can be contacted with the anion exchange resin in a low ionic strength buffer (e.g., a 5 to 20 millimolar buffer salt) at a pH of about 3 to 10 or at a pH of about 6-8. To release the adsorbed biomolecule, a high ionic strength buffer is contacted with the anion exchange resin. In some embodiments, the high ionic strength buffer includes that same buffer composition used to adsorb the material plus 1 molar sodium chloride. The adsorption and release processes are typically performed at temperatures near room temperature.

The sample containing positively charged materials is usually contacted with a cation exchange resin at a pH where the cation exchange resin has negatively charged groups (e.g., at a pH of 7 to 12). To release the adsorbed material from the cation exchange resin, the pH can be lowered to at least 6 (e.g., the pH can be 2 to 5). Alternatively, when the charged material is a biomolecule, the sample can be contacted with the anion exchange resin in a low ionic strength buffer (e.g., 5 to 20 millimolar buffer salt) at a pH of about 3 to 10 or at a pH of about 6-8. To release the adsorbed biomolecule, a high ionic strength buffer is contacted with the cation exchange resin. In some embodiments, the high ionic strength buffer includes that same buffer composition used to adsorb the material plus 1 molar sodium chloride. The adsorption and release processes are typically performed at temperatures near room temperature.

Buffer salts useful for controlling pH include, but are not limited to, sodium phosphate, sodium carbonate, sodium bicarbonate, sodium borate, sodium acetate, and TRIS (tris (hydroxymethyl)aminomethane). Other suitable buffers include "Good's" buffers such as MOPS (3-morpholinopropanesulfonic acid), EPPS (4-(2-hydroxyethyl)piperazine-1-propanesulfonic acid), MES (2-morpholinoethanesulfonic acid), and others.

Some samples include a biomolecule. The biomolecule can be separated from the other sample constituents or can be purified. Suitable biomolecules include, for example, proteins, enzymes, vaccines, DNA, and RNA. Adjusting the pH of the sample can alter the charge of some biomolecules.

In yet another aspect, a chromatographic column is provided. The chromatographic column includes a column at least partially filled with an ion exchange resin. The ion exchange resin is the reaction product of a monomer mixture that is substantially free of a monomer having a lipophilicity index greater than 20. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

Suitable columns are known in the art and can be constructed of such materials as glass, polymeric material, stainless steel, titanium and alloys thereof, or nickel and alloys thereof. Methods of filling the column to effectively pack the ion exchange resin in the column are known in the art.

The chromatographic columns can be part of an analytical instrument such as a liquid chromatograph. When packed with the ion exchange resin, the chromatographic column can be used to separate an ionic material from non-ionic materials or to separate one ionic material from another ionic material with a different charge density. The amount of the ionic material in the sample can be determined.

The chromatographic columns can be part of a preparative liquid chromatographic system to separate or purify an ionic material. The preparative liquid chromatographic system can be a laboratory scale system, a pilot plant scale system, or an industrial scale system.

In yet another aspect, a filtration element is provided that includes a filtration medium and an ion exchange resin disposed a surface of the filtration medium. The ion exchange resin is the reaction product of a monomer mixture that is substantially free of a monomer having a lipophilicity index greater than 20. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

The filter element can be positioned within a housing to provide a filter cartridge. Suitable filtration medium and systems that include a filter cartridge are further described, for example, in U.S. Pat. No. 5,468,847 (Heilmann et al.), incorporated herein by reference. Such a filter cartridge can be used to purify or separate biomolecules.

The filtration medium can have a single filtration layer or multiple filtration layers. The filtration medium can be prepared from glass or polymeric fibers (e.g., polyolefin fibers such as polypropylene fibers). In some embodiments, the filtration medium includes a coarse pre-filtration layer and one or more finer filtration layers. For example, the filtration medium can include a coarse pre-filtration layer and then a series of additional filtration layers with progressively smaller average pore sizes. The ion exchange resin can be positioned on the layer of the filtration medium having the smallest average pore size.

Selection of the pore size of the filtration medium depends on the size of the ion exchange resin. Typically the pore size of the filtration medium is selected to be smaller than the average diameter of the ion exchange resin. However, a portion of the ion exchange resin can penetrate into the filtration medium.

The filtration medium can be in the form of vertical pleated filters such as those described in U.S. Pat. No. 3,058,594. In other embodiments, the filtration medium is in the form of horizontal, compound radially pleated filters such as those described in U.S. Pat. No. 4,842,739 (Tang et al.), incorporated herein by reference. A horizontal arrangement of the pleats can be desirable in applications where a filter cartridge containing the filtration medium is used in the vertical direction. Such an arrangement can reduce the loss of the ion exchange resin from the filter element during use and storage.

In still another aspect, a composite material is provided that includes a continuous, porous matrix and an ion exchange resin incorporated within the porous matrix. The ion exchange resin is the reaction product of a monomer mixture that is substantially free of a monomer having a lipophilicity index greater than 20. The monomer mixture includes a N,N'-alkylenebis(meth)acrylamide crosslinking monomer in an amount greater than 25 weight percent and an ionic monomer in an amount of at least 35 weight percent based on a total weight of monomers in the monomer mixture. The ion exchange resin is in the form of macroporous particles having an average size of at least 20 micrometers and a surface area of at least 50 $m^2/g$.

The continuous, porous matrix is typically a woven or non-woven fibrous web, porous fiber, porous membrane, porous film, hollow fiber, or tube. Suitable continuous, porous matrixes are further described in U.S. Pat. No. 5,993,935 (Rasmussen et al.), incorporated herein by reference.

A continuous, porous matrix that is a fibrous web can provide such advantages as, for example, large surface area, ease of manufacture, low material cost, and a variety of fiber textures and densities. Although a wide range of fiber diameters is suitable, the fibers often have an average diameter of 0.05 micrometers to 50 micrometers. The web thickness can be varied to fit the end use application (e.g., about 0.2 micrometers to about 100 cm).

The composite material can be prepared, for example, using melt-blowing methods. For example, a molten polymeric material can be extruded to produce a stream of melt blown fibers. The ion exchange resin can be introduced into the stream of fibers and intermixed with the fibers. The mixture of fibers and ion exchange resin can be collected on a screen such that a web is formed. The ion exchange resin can be dispersed within the fibrous web. In some embodiments, the ion exchange resin can be dispersed uniformly throughout the fibrous web.

The composite material can also be prepared with a fibrillated polymer matrix such as fibrillated polytetrafluoroethylene (PTFE). Suitable methods are more fully described in U.S. Pat. No. 4,153,661 (Ree et al.); U.S. Pat. No. 4,565,663 (Errede et al.); U.S. Pat. No. 4,810,381 (Hagen et al.); and U.S. Pat. No. 4,971,736 (Hagen et al.), all of which are incorporated herein by reference. In general, these methods involve blending the ion exchange resin with a polytetrafluoroethylene dispersion to obtain a putty-like mass, subjecting the putty-like mass to intensive mixing at a temperature of 5° C. to 100° C. to cause fibrillation of the PTFE, biaxially calendaring the putty-like mass, and drying the resultant sheet.

In another method of preparing the composite material, the ion exchange resin can be dispersed in a liquid and then blended with a thermoplastic polymer at a temperature sufficient to form a homogenous mixture. The homogeneous mixture can be placed in a mold having a desired shape. Upon cooling of the mixture, the liquid can be phase separated leaving a thermoplastic polymeric matrix that contain dispersed ion exchange resin particles. This method is further described in U.S. Pat. No. 4,957,943 (McAllister et al.), incorporated herein by reference.

The amount of ion exchange resin incorporated into the continuous, porous matrix is at least 1 volume percent, at least 5 volume percent, at least 10 volume percent, at least 20 volume percent, at least 30 volume percent, at least 40 volume percent, or at least 50 volume percent based on the volume of the resulting composite. The amount of ion exchange resin incorporated into the continuous, porous matrix can contain up to 99 volume percent, up to 95 volume percent, up to 90 volume percent, up to 85 volume percent, or up to 80 volume percent based on the volume of the resulting composite. Composites having a higher amount of ion exchange resin tend to have a higher ion exchange capacity.

The foregoing describes the invention in terms of embodiments foreseen by the inventor for which an enabling description was available, notwithstanding that insubstantial modifications of the invention, not presently foreseen, may nonetheless represent equivalents thereto.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Aldrich Chemical Company; Milwaukee, Wis. unless otherwise noted.

Test Methods

Cation Exchange Capacity

A 0.8 centimeter by 4 centimeter polypropylene disposable chromatography column (Poly-Prep Column, Bio-Rad Laboratories, Hercules, Calif.) was packed with 1 mL of ion exchange resin. The column bed was equilibrated by washing with 10 mL of loading buffer, a solution of 10 $\underline{mM}$ MOPS (4-morpholinopropanesulfonic acid) at p H 7.5. The column bed was then loaded with 30 mL of protein solution (chicken egg white lysozyme, approx. 95% purity, Sigma Chemical Co.) having a concentration of 12 mg/mL in the MOPS buffer. All buffer and protein solutions were prepared in deionized water. Any unbound lysozyme was washed off with 30 mL of the MOPS buffer (three 10 mL fractions). Finally, bound protein was eluted with 15 mL of 1 $\underline{M}$ NaCl in MOPS buffer.

The amount of protein recovered in the various fractions was determined by measuring the UV absorbance at 280 nm using a Hewlett-Packard Diode Array Spectrophotometer, Model 8452A. A standard curve was prepared using pure lysozyme. The amount of protein recovered in the NaCl eluate was equated to the cation exchange capacity for the support.

Anion Exchange Capacity

The procedure used was similar to that described above for determining the cation exchange capacity except that the protein loaded was bovine serum albumin (BSA, fraction V, 96-99% purity, Sigma Chemical Co.). Pure BSA (Albumin Standard, Pierce Chemical Co., Rockford, Ill.) was used to construct the standard curve.

Table of Abbreviations

| Abbreviation or Trade Designation | Description |
|---|---|
| MBA | N,N'-methylenebisacrylamide |
| VDM | 4,4-dimethyl-2-vinyl-1,3-oxazolin-4-one (vinyldimethylazlactone) |
| DEEDA | N,N-diethylethylenediamine |
| AMPS | 2-acrylamido-2-methylpropanesulfonic acid commercially available as a 50% aqueous solution of the sodium salt, AMPS 2405 Monomer, from Lubrizol Corp., Wickliffe, Ohio. |
| MAPTAC | [3-(methacryloylamino)propyl]trimethylammonium chloride used as a 50% w/w solution in water. |

-continued

Table of Abbreviations

| Abbreviation or Trade Designation | Description |
|---|---|
| DEAEMA | 2-(diethylamino)ethyl methacrylate. |
| TMAEA | [2-(acryloyloxy)ethyl]trimethyl-ammonium methyl sulfate used as a 80% w/w solution in water. |
| TMEDA | N,N,N',N'-tetramethylethylenediamine. |
| BSA | bovine serum albumin. |
| VDM-DEEDA adduct | See synthesis example below. |

Synthesis Example 1

Preparation of VDM-DEEDA Adduct

Heptane (1000 mL) and VDM (20.00 grams) were added to a flask equipped with an overhead stirrer. Diethylethylenediamine (16.69 grams) was added dropwise to the flask over 30 minutes. The mixture was then stirred for an additional hour. The resulting colorless precipitate was filtered. After standing several hours, the additional amount of precipitate that formed was filtered. The combined product was dried at room temperature in a vacuum oven. Yield: 32.07 grams. $^1$H and $^{13}$C-NMR analysis confirmed the structure of the expected acrylamide adduct, with a purity greater than 98.5%. This monomer was utilized without further purification.

Example 1

A 35:65 by weight AMPS/MBA copolymer was prepared by reverse-phase suspension polymerization. The reverse-phase suspension polymerization method is further described in U.S. Pat. No. 5,403,902. A polymeric stabilizer (0.28 grams), toluene (132 mL), and heptane (243 mL) were added to a flask equipped with a mechanical stirrer (stirring rate 450 rpm), nitrogen inlet, thermometer, heating mantel with temperature controller, and condenser. The polymeric stabilizer was a 91.8: 8.2 by weight copolymer of isooctylacrylate and 2-acrylamidoisobutyramide (prepared as described in Rasmussen, et al., *Makromol. Chem., Macromol. Symp.,* 54/55, 535-550 (1992)). The non-aqueous solution in the flask was heated to 35° C. with stirring, and sparged with nitrogen for 15 minutes.

An aqueous solution was prepared that contained MBA (9.10 grams), AMPS (9.80 grams of a 50% by weight aqueous solution), methanol (50 mL), and deionized water (45.1 mL). This second solution was stirred and heated at 30-35° C. to dissolve the MBA. Sodium persulfate (0.5 grams) was added to the second solution with additional stirring to dissolve the persulfate. The aqueous solution was added to the reaction flask containing the non-aqueous solution. The resulting mixture was stirred and nitrogen sparged for 5 minutes. TMEDA (0.5 mL) was added to initiate the polymerization. The reaction temperature quickly rose to 42.5° C., then slowly subsided. The reaction mixture was stirred for a total of 2.5 hours from the time of TMEDA addition, filtered using a sintered glass funnel, washed with acetone (5×250 mL), and dried at room temperature under vacuum to yield 15.7 grams of colorless particles.

Microscopic examination revealed spherical particles ranging from about 20-200 micrometers in diameter. These particles were classified to provide a size range of about 40-110 micrometers, and then packed into 15 mL disposable chromatography columns to give a column bed of 1 mL. The protein cation exchange capacity was measured according to the procedure described in the Test Methods using lysozyme as the protein. Surface area and porosity measurements were performed by nitrogen adsorption using a Micromeritics ASAP 2400 instrument according to the manufacturer's directions (Micromeritics Instrument Corp, Norcross, Ga.). In particular, the surface area was calculated by the BET method using 5 adsorption points between relative pressures of 0.05 and 0.20; the average pore size was determined by the BJH method from the desorption isotherm using 23 adsorption and 23 desorption points at relative pressures between 0.05 and 0.995 with one saturation point. These data are presented in Table 1.

Examples 2-7

Copolymers of MBA with AMPS were prepared by reverse phase suspension polymerization as described in Example 1, using varying ratios of the two monomers as shown in Table 1. Particles isolated from the synthetic prep were analyzed for surface area, pore diameter, and cation exchange capacity for the protein, lysozyme. The results are also shown in Table 1.

TABLE 1

Examples 1-7

| Example | Weight % MBA | Weight % AMPS | Surface Area by BET ($m^2$/gram) | Average Pore Diameter (Angstroms) | Cation Exchange Capacity for Lysozyme (mg/mL) |
|---|---|---|---|---|---|
| 1 | 65 | 35 | 143 | 46 | 99 |
| 2 | 60 | 40 | 146 | 39 | 117 |
| 3 | 50 | 50 | 98 | 41 | 123 |
| 4 | 40 | 60 | 199 | 116 | 161 |
| 5 | 35 | 65 | 154 | 176 | 175 |
| 6 | 30 | 70 | 113 | 176 | 163 |
| 7 | 25 | 75 | 22 | 163 | 153 |

Examples 8-12

Copolymers of MBA with amine containing monomers were prepared by reverse phase suspension polymerization as described for Example 1 above using the amine containing monomers and ratios of MBA with amine containing monomer shown in Table 2. Particles isolated from the synthetic prep were analyzed for surface area, pore diameter, and ion exchange capacities for BSA. The results are shown in Table 3.

TABLE 2

Examples 8-12 Composition

| Example | Weight % MBA | Identity of Amine Containing Monomer | Weight % Amine Containing Monomer |
|---|---|---|---|
| 8 | 50 | MAPTAC | 50 |
| 9 | 50 | DEAEMA | 50 |
| 10 | 30 | DEAEMA | 70 |
| 11 | 60 | TMAEA | 40 |
| 12 | 50 | VDM-DEEDA | 50 |

TABLE 3

Examples 8-12 Characterization

| Example | Surface Area by BET (m²/gram) | Average Pore Diameter (Angstroms) | Anion Exchange Capacity for BSA (mg/mL) |
|---|---|---|---|
| 8 | 131 | 103 | 10 |
| 9 | 248 | 133 | 33 |
| 10 | 156 | 63 | 20 |
| 11 | 80 | 40 | 33 |
| 12 | 83 | 71 | 47 |

What is claimed is:

1. An anion exchange resin that is a reaction product of a monomer mixture dissolved in an aqueous phase, the monomer mixture comprising
    (a) a N,N'-alkylenebis(meth)acrylamide crosslinking monomer in an amount greater than 25 weight percent based on a total weight of monomers in the monomer mixture;
    (b) an ionic monomer in an amount of at least 35 weight percent based on a total weight of monomers in the monomer mixture, each ionic monomer having a group capable of interacting with a negatively charged material, wherein the monomer mixture is free of an ionic monomer having a group capable of interacting with a positively charged material;
    (c) 0 to no greater than 1 weight percent based on the total weight of monomers in the monomer mixture of a hydrophobic monomer having a lipophilicity index greater than 20,
    wherein each monomer in the monomer mixture is a (meth)acrylate monomer, a (meth)acrylamide monomer, or derivative thereof;
    wherein said anion exchange resin is in the form of macroporous particles having an average size of at least 20 micrometers and a surface area of at least 50 m²/g.

2. The anion exchange resin of claim 1, wherein the monomer mixture comprises greater than 25 to 65 weight percent N,N'-alkylenbis(meth)acrylamide crosslinking monomer and 35 to 75 weight percent ionic monomer.

3. The anion exchange resin of claim 1, wherein the ionic monomer comprises a weak base, a strong base, a salt of a weak base, a salt of a strong base, or combinations thereof.

4. The anion exchange resin of claim 1, wherein the ion exchange resin has a surface area of 50 to 500 m²/g.

5. The anion exchange resin of claim 1, wherein the ion exchange resin has an average particle size of 20 to 500 micrometers.

6. The anion exchange resin of claim 1, wherein the ion exchange resin is in the form of spherical beads.

7. The anion exchange resin of claim 1, wherein the ion exchange resin is an anion exchange resin with a capacity of at least 10 milligrams of bovine serum albumin per milliliter of ion exchange resin.

8. An ion exchange resin comprising the reaction product of a monomer mixture that is substantially free of a monomer having a lipophilicity index greater than 20, said monomer mixture comprising
    (a) a N,N'-alkylenebis(meth)acrylamide crosslinking monomer in an amount greater than 25 weight percent based on a total weight of monomers in the monomer mixture; and
    (b) an ionic monomer in an amount of at least 35 weight percent based on a total weight of monomers in the monomer mixture, the ionic monomer comprising a weak base, a strong base, a salt of a weak base, a salt of a strong base, or combinations thereof, wherein the ionic monomer comprises a dialkylaminoalkylamine adduct of alkenylazlactone,
    wherein said ion exchange resin is in the form of macroporous particles having an average size of at least 20 micrometers and a surface area of at least 50 m²/g.

9. An anion exchange resin that is a reaction product of a monomer mixture dissolved in an aqueous phase, the monomer mixture comprising
    (a) a N,N'-alkylenebis(meth)acrylamide crosslinking monomer in an amount greater than 25 weight percent based on a total weight of monomers in the monomer mixture;
    (b) an ionic monomer in an amount of at least 35 weight percent based on a total weight of monomers in the monomer mixture, wherein each ionic monomer is selected from N,N-dialkylaminoalkyl(meth)acrylate, (meth)acrylamidoalkyltrimethylammonium salt, (meth)acryloxyalkyltrimethylammonium salt, or combinations thereof, wherein the monomer mixture is free of an ionic monomer having a group capable of interacting with a positively charged material;
    (c) 0 to no greater than 1 weight percent based on the total weight of monomers in the monomer mixture of a hydrophobic monomer having a lipophilicity index greater than 20,
    wherein each monomer in the monomer mixture is a (meth)acrylate monomer, a (meth)acrylamide monomer, or derivative thereof.

10. The anion exchange resin of claim 9, wherein the anion exchange resin is in the form of macroporous particles having an average size of at least 20 micrometers and a surface area of at least 50 m²/g.

11. The anion exchange resin of claim 9, wherein the N,N-dialkylaminoalkyl(meth)acrylate is selected from N,N-dimethylaminoethylmethacrylate, N,N-dimethylaminoethylacrylate, N,N-dimethylaminopropylmethacrylate, N,N-dimethylaminopropylacrylate, or 2-(diethylamino)ethylmethacrylate.

12. The anion exchange resin of claim 9, wherein the (meth)acrylamidoalkyltrimethylammonium salt is selected from 3-methacrylamidopropyltrimethylammonium chloride or 3-acrylamidopropyltrimethylammonium chloride.

13. The anion exchange resin of claim 9, wherein the (meth)acryloxyalkyltrimethylammonium salt is selected from 2-acryloxyethyltrimethylammonium chloride, 2-methacryloxyethyltrimethylammonium chloride, or 2-acryloxyethyltrimethylammonium methyl sulfate.

14. The anion exchange resin of claim 1, wherein each ionic monomer is selected from N,N-dimethylaminoethylmethacrylate, N,N-dimethylaminoethylacrylate, N,N-dimethylaminopropylmethacrylate, N,N-dimethylaminopropylacrylate, N-tert-butylaminopropylmethacrylate, N-tert-butylaminopropylacrylate, N-(3-aminopropyl)methacrylamide, N-(3-aminopropyl)acrylamide, N-(3-imidazolylpropyl)methacrylamide, N-(3-imidazolylpropyl)acrylamide, N-(2-imidazolylethyl)methacrylamide, N-(1,1-dimethyl-3-imidazoylpropyl)methacrylamide, N-(1,1-dimethyl-3-imidazoylpropyl)acrylamide, N-(3-benzoimidazolylpropyl)acrylamide, N-(3-benzoimidizolylpropyl)methacrylamide, 3-methacrylamidopropyltrimethylammonium chloride and 3-acrylamidopropyltrimethylammonium chloride, 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, 2-acryloxyethyltrimethylammonium methyl sulfate, 2-(diethylamino)ethylmethacrylate, or combinations thereof.

15. The anion exchange resin of claim 1, wherein each ionic monomer is selected from N,N-dialkylaminoalkyl (meth)acrylate, (meth)acrylamidoalkyltrimethylammonium salt, (meth)acryloxyalkyltrimethylammonium salt, or combinations thereof.

16. The anion exchange resin of claim 15, wherein the N,N-dialkylaminoalkyl(meth)acrylate is selected from N,N-dimethylaminoethylmethacrylate, N,N-dimethylaminoethylacrylate, N,N-dimethylaminopropylmethacrylate, N,N-dimethylaminopropylacrylate, or 2-(diethylamino)ethylmethacrylate.

17. The anion exchange resin of claim 15, wherein the (meth)acrylamidoalkyltrimethylammonium salt is selected from 3-methacrylamidopropyltrimethylammonium chloride or 3-acrylamidopropyltrimethylammonium chloride.

18. The anion exchange resin of claim 15, wherein the (meth)acryloxyalkyltrimethylammonium salt is selected from 2-acryloxyethyltrimethylammonium chloride, 2-methacryloxyethyltrimethylammonium chloride, or 2-acryloxyethyltrimethylammonium methyl sulfate.

* * * * *

UNITED STATES PATENT AND TRADEMARK OFFICE
CERTIFICATE OF CORRECTION

| | |
|---|---|
| PATENT NO. | : 7,582,684 B2 |
| APPLICATION NO. | : 11/059858 |
| DATED | : September 1, 2009 |
| INVENTOR(S) | : Jerald Kenneth Rasmussen et al. |

It is certified that error appears in the above-identified patent and that said Letters Patent is hereby corrected as shown below:

Page 2, Column 2 (Other Publications)
Line 1, delete "(styrnee" and insert -- (styrene --, therefor.

Column 3
Line 13, delete "nitrites," and insert -- nitriles, --, therefor.

Column 7
Line 20, delete "vinyldimethylaziactone)" and
insert -- vinyldimethylazlactone) --, therefor.

Line 21, delete "diallyldimthylammonium" and
insert -- diallyldimethylammonium --, therefor.

Column 9
Line 41, delete "phase" and insert -- phase. --, therefor.

Column 17
Line 41, in Claim 2, delete "alkylenbis" and insert -- alkylenebis --, therefor.

Signed and Sealed this
Thirteenth Day of September, 2011

David J. Kappos
*Director of the United States Patent and Trademark Office*